United States Patent

Livingston

[11] Patent Number: 5,939,706
[45] Date of Patent: Aug. 17, 1999

[54] ADAPTIVE FOCAL PLANE FOR HIGH CONTRAST IMAGING

[75] Inventor: Peter M. Livingston, Palos Verdes Estates, Calif.

[73] Assignee: TRW Inc., Redondo Beach, Calif.

[21] Appl. No.: 08/984,412

[22] Filed: Dec. 3, 1997

[51] Int. Cl.[6] .................................................. G01J 1/20
[52] U.S. Cl. ...................... 250/203.1; 356/4.01; 250/225
[58] Field of Search .............................. 250/203.1, 203.2, 250/203.3, 203.6, 208.1, 216, 201.7, 225; 356/4.01, 4.07, 141.2, 141.5

[56] References Cited

U.S. PATENT DOCUMENTS 5,770,850  6/1998  Bowen et al. ......................... 250/203.1

Primary Examiner—Edward P. Westin
Assistant Examiner—Kevin Pyo
Attorney, Agent, or Firm—Michael S. Yatsko

[57] ABSTRACT

A high contrast imaging system (10) having an adaptive focal plane (52). The system (10) includes receiver optics (32) that receive radiation (30) from both a detected target (16) and a laser beam (14) incident thereon, and a polarizing beam splitter (44) that splits the radiation into a first beam of reflected laser radiation and a second beam of radiation (46). The polarizing beam splitter (44) linearly polarizes the second beam of detected target radiation (46). A beam polarizer (48) circularly polarizes the second beam of detected target radiation (46). An adaptive focal plane or micromirror array (52) reflects the circularly polarized detected target radiation back through the beam polarizer (48) to linearly polarize the reflected, second beam of radiation (46). A detector array (56) detects the reflected, second beam of radiation (62) and outputs a signal to tracker electronics (22) in accordance with the intensity of radiation. Tracker electronics (22) adjust the reflectivity of the micromirror array (52) to ensure that the radiation incident on the detector array (56) is at or below a predetermined threshold.

18 Claims, 4 Drawing Sheets

ADAPTIVE FOCAL PLANE FOR HIGH CONTRAST IMAGING

BACKGROUND OF THE INVENTION

1. Technical Field

The present invention relates generally to imaging systems which capture images having portions of high contrast and which reduce the intensity of portions of the image that exceed a predetermined threshold and, in particular, to an imaging system which employs a micromirror array having addressable sections of varying reflectivity so that portions of the image irradiating the micromirror array above a predetermined intensity threshold are reflected at or below the predetermined threshold by varying the reflectivity of each particular section.

2. Discussion

Many varied applications take advantage of the technology available for capturing an image and analyzing or processing the captured image. The captured image may be used by an image processing system for analysis and/or decision making. Examples of the various uses for imaging and image processing systems include astronomy, medical technology, weapon systems, and many other applications. For example, in astronomy, astronomers often use imaging technology in order to investigate sun spots or search for new planets or stars. In the medical field, imaging devices and image processors prove useful for x-ray procedures and for more advanced physiological scanning procedures such as computer assisted tomography scanning (CATSCAN) and magnetic resonance imaging (MRI). In the weaponry field, imaging devices and image processors prove useful for defensive targeting and destruction of both ground-based and airborne vehicles and munitions.

In each of the applications discussed above, the image captured by the imaging device typically includes a background or field of relatively low intensity, possibly objects of relatively medium intensity, and objects of relatively high intensity, to create a high contrast image. Present imaging systems and image processors discriminate between these relative intensities, but not without suffering a sometimes substantial loss or distortion of the captured image. When imaging devices and image processors seek only to capture light of a particular intensity and wavelength, various filters may be employed to eliminate light outside of a predetermined intensity and frequency band. Such filtration may resultantly cause distortion that is often severe enough to distort the particular object of interest. Thus, filtering the entirety of the captured image often results in an unacceptable distortion or even information loss in the captured image.

In a particular application, image trackers are often used in conjunction with lasers or other weaponry to disable in-flight missiles. Conventional image trackers presently employ only non-self-referencing schemes for directing a laser beam to a desired target aimpoint. In practice, this means that the laser beam direction in space is inferred from the tracker line of sight as the tracker tracks the missile.

Trackers using imaging, non-self-referencing techniques typically utilize one or more imaging devices, such as electronic cameras, that first determine an approximate, or wide field of view (WFOV) position, and then an instantaneous, or narrow field of view (NFOV), position of a targeted object. A target coordinate system is then typically established by determining the centroid of the target image. After capturing the target image in the NFOV's track gate, the tracker, under servo-loop control, follows the target. In most instances, the tracker is physically mounted on gimbals in a beam pointer. Therefore, the pointer line-of-sight also tracks the target if the pointer and tracker are properly boresighted.

Although conventional imaging, non-self-referencing trackers often provide adequate target location functions, a number of limitations exist with such systems. For example, in medium wave forward looking infrared (FLIR) based trackers, the laser weapon used for target engagement often interferes with the tracker imaging system, as instantaneous non-specular return from the laser hit spot on the object often blinds the camera, or, at least causes the camera automatic gain control to reduce camera gain to accommodate the bright laser hit spot, thereby losing all target image information. Typically, the laser-reflected power is some 40 to 60 dB greater than the target thermal signature. Additionally, with regard to long wave FLIR based systems, bright thermal energy from heated warheads may also blind such systems, causing the systems to lose track of the targeted object.

Solutions to the above problems include programming the system to select a laser aim point outside of the narrow field of view (NFOV) or the use of short wave infrared (SWIR) track bands with active illumination, causing the laser return to be invisible to the NFOV SWIR camera. If the laser aim point is selected outside of the view of NFOV however, the laser beam pointing must be determined by feed forward estimation. Such an aim point selection is undesirable, as it eliminates missile nose-kill possibilities, and is subject to estimation noise as explained earlier. Alternatively, if a SWIR track band is used, the laser beam pointing must also be done via feed forward estimation. Such a scheme increases the susceptibility of the tracker to atmospheric disturbances.

Additionally, with non-self-referencing imaging trackers, the tracker line-of-sight must be accurately boresighted with the laser weapon line of sight. Due to the design of such systems, it has been found difficult to maintain an accurate bore sight under adverse environmental conditions.

Self-referencing trackers solve the above described limitations of the conventional imaging, non-self-referencing trackers by referencing the laser beam instantaneous position to the target image itself rather than to the tracker line-of-sight direction. Also, self-referencing trackers have lines of sight that need not be coaxial with the laser weapon, thereby subsequently minimizing the weight on the system gimbals and simplifying system transmit optics.

Further, systems such as disclosed in pending U.S. patent application Ser. No. 08/631,645, entitled "Laser Crossbody Tracking System and Method", U.S. patent application Ser. No. 08/763,635, filed Dec. 4, 1996, entitled "A Novel Tracking Means for Distant Ballistic Missile Tracers," and U.S. patent application Ser. No. 08/760,434, filed Dec. 14, 1996, entitled "Laser Crossbody and Feature Curvature Tracker" ("the LACROSST patent applications"), both incorporated herein by reference, provide non-imaging self-referencing trackers.

In view of the foregoing, there is a need for an imaging system that can discriminate objects of differing intensities in high contrast images. Further, there is a need for an imaging system which filters out radiation at a particular intensity while limiting distortion of the remaining image. Further yet, there is a need for an adaptive focal plane imaging system having addressable sections to vary the intensity of sections of the captured image.

SUMMARY OF THE INVENTION

According to the present invention, a high contrast imaging optical system, includes receiver optics that receive radiation from a detected target. The received radiation has a varying intensity. A polarizing beam splitter reflects a first portion of the radiation and passes through a second portion of the radiation. The polarizing beam splitter linearly polarizes the second portion of the radiation. A beam polarizer circularly polarizes the linearly polarized second beam of the radiation. A mirror reflects the circularly polarized radiation back through the beam polarizer to linearly polarize the reflected, second beam of radiation. The linearly polarized, reflected beam is reflected by the beam splitter toward an imaging plane for imaging. The mirror has a plurality of sections whose reflectivity may be varied, and the reflectivity of a section is varied to reduce the reflectivity when the section is irradiated by circularly polarized radiation that exceeds a predetermined threshold.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
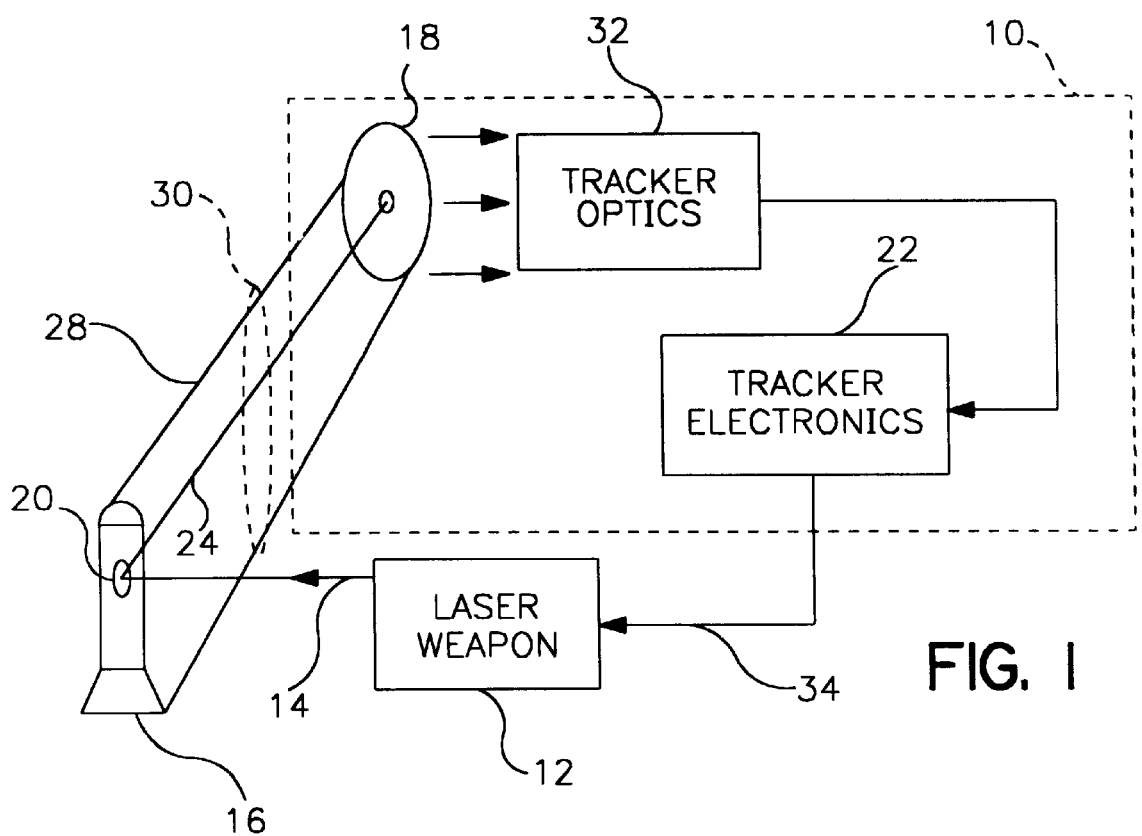
FIG. 1 is a schematic block diagram of an exemplary application of the present invention embodied as a missile tracker.

Referring to FIG. 1, a missile tracker system provides an exemplary application according to a preferred embodiment of the present invention and is shown generally at 10. The system is implemented in conjunction with a laser weapon 12 to steer a laser beam 14 produced by the laser weapon into engagement with a target, such as the missile shown at 16. The actual point of engagement of the laser beam 14 is shown at 20 and is referred to hereinafter as the laser beam hit spot. Radiation 24 reflected from the hit spot 20, in combination with radiation 28 reflected from the missile, form an input cone of radiation, indicated generally at 30. As will now be described, the tracker which provides an exemplary application of the present invention images both the missile 16 and the laser beam hit spot 20 in a manner that minimizes loss of missile information Referring to FIG. 2, tracker input optics 18 receives and passes the input cone of radiation 30 to tracker optics 32. As will be described in more detail below, the tracker optics 32 image the missile body and the laser beam hit spot 20 and output the imaging information to tracker electronics 22. Tracker electronics 22 generate control commands to differentiate objects of varying contrast within the image. Tracker electronics 22 also process the imaging information and output laser beam steering commands 34 to the laser weapon 12. The steering commands close the distance between the target aim point and the laser beam hit spot 20 and maintain the hit spot at the target aim point until a target kill is achieved.

Figure 2:
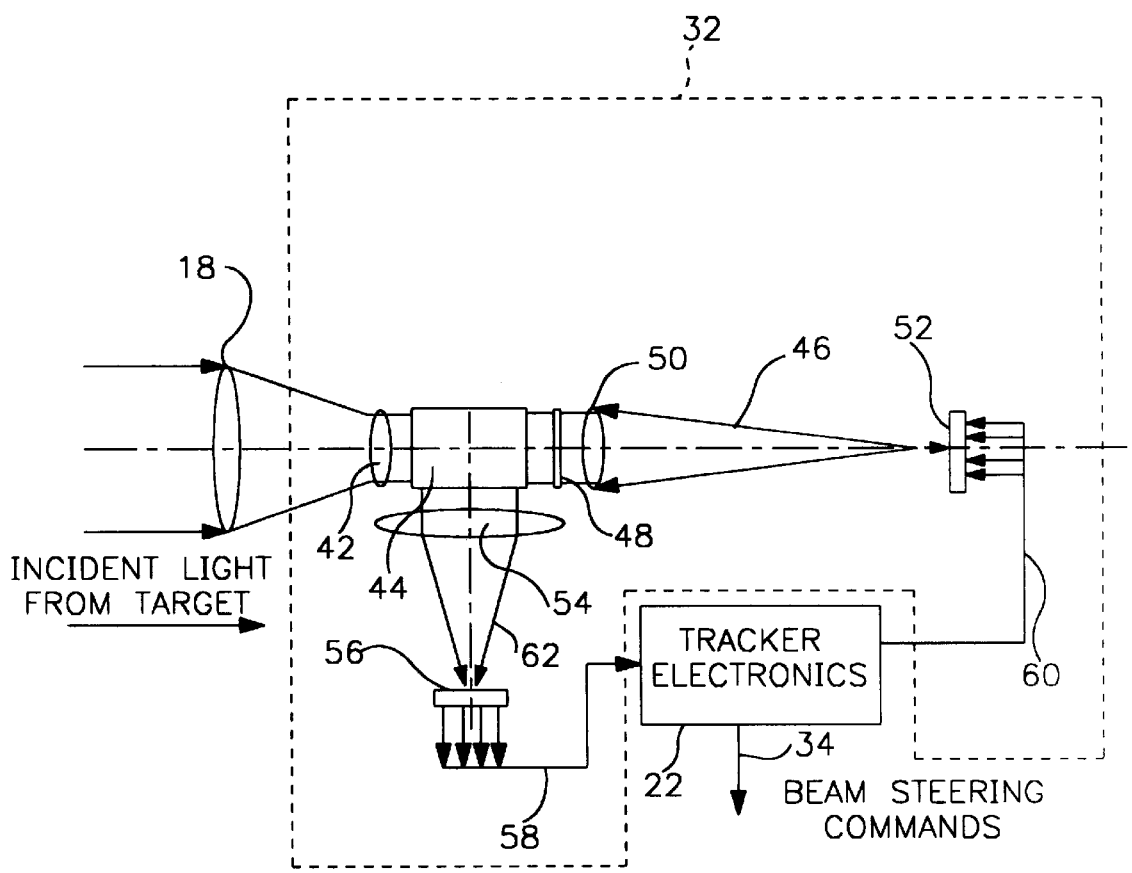
FIG. 2 is a diagram of adaptive focal plane for high contrast imaging system and associated electronics in accordance with the invention of FIG. 1.

Still referring to FIG. 2, tracker optics 32 are shown in more detail. The optics include a recollimating lens 42. The recollimating lens passes the parallel-ray input column of radiation 30 onto a polarizing beam splitter 44. The polarizing beam splitter 44 splits the input column of radiation into two separate beams of radiation. Half of the radiation reflects upward as a first beam of radiation at approximately 3 decibels (dB) loss.

Beam splitter 44 passes a second beam of radiation 46 through a quarter wave plate 48. The beam of radiation 46 is circularly polarized after it passes through quarter wave plate 48 before passing through secondary imaging lens 50. Secondary imaging lens 50 images the beam of radiation onto an adaptive focal plane or micromirror array 52. Preferably, micromirror array 52 consists of a plurality of individual mirror elements that, in combination, reflect the beam of radiation 46 back through imaging lens 50 and quarter wave plate 48. The beam of radiation 46, upon passing again through quarter wave plate 48, becomes linearly polarized with an orientation perpendicular to the initial linear polarization. As a result, the radiation is reflected by the beam splitter 44 through secondary imaging lens 54 onto focal plane detector array 56. Focal plane detector array 56 is preferably a platinum-silicide or HgCdTe charge coupled device (CCD) array consisting of a grid of individual sensor elements that each output an electrical signal in response to the radiation incident thereon. Detector array 56 generates and outputs electrical signals, as indicated at 58, to tracker electronics 22.

Tracker electronics 22 subsequently process the electrical signals 58. Preferably tracker electronics 22 include a processor programmed with a target tracking algorithm, such as that disclosed in the pending LACROSST patent applications that have been incorporated by reference. Tracker electronics 22 reference the signals from the detector array 56 in a common coordinate system along with the target aimpoint. Tracker electronics 22 process signals and output beam steering commands 34 in response thereto to close the distance between the target aimpoint and the laser beam hit spot. Tracker electronics 22 also generate commands 60 to vary the reflectivity of adaptive focal plane or micromirror array 52.

Figure 3:
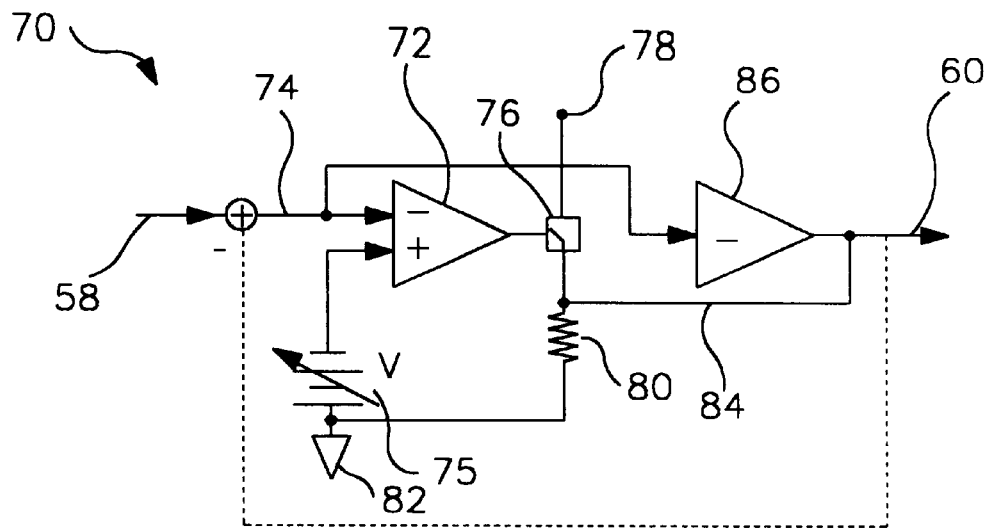
FIG. 3 is a circuit diagram of an electronic circuit for generating control signals to vary the reflectivity of the individual micromirrors of the micromirror array.

FIG. 3 is a circuit diagram of an electronic circuit for generating control signals to vary the reflectivity of the individual micromirrors or pixels of the adaptive focal plane or micromirror array 52. Such circuit may be part of tracker electronics 22 which generate a control signal 60 for input to micromirror array 52 to the vary the reflectance of a particular micromirror or pixel. Control signal 60 preferably includes an address of the particular pixel of the micromirror array 52 to be controlled by the control signal 60. Preferably, each micromirror or pixel of micromirror array 52 corresponds to a pixel of detector array 56. Thus, detector array 56 and micromirror array 52 are coregistered.

Referring to FIG. 3, comparator 70 receives an electrical signal 58 from detector array 56. The electrical signal 58 varies in accordance with the intensity of irradiation on a particular pixel of detector array 56. Comparator 70 outputs a control signal 60 which varies the reflectance of a particular micromirror or pixel of micromirror array 52. Control signal 60 also provides a feedback signal which is subtracted from the input electrical signal 58 received from detector array 56 to provide a difference signal 74. Difference signal 74 is input to the negative terminal of a differential amplifier 72, where difference signal 74 is compared against a fixed voltage V output by a voltage source 75. Voltage source 75 may be adjusted in order to increase or decrease the fixed voltage V, thereby varying the threshold value for the maximum intensity of reflected light irradiating the individual pixels of detector array 56. Differential amplifier 72 outputs a signal in accordance with the difference between the fixed voltage signal V and the differential signal 74. If differential signal 74 is less than the fixed voltage V, differential amplifier 72 outputs a signal which maintains switch 76 open. If differential signal 74 exceeds the fixed voltage V, differential amplifier 72 outputs a signal to close switch 76 causing a voltage drop from the source S through resistor 80 to drain 82. This produces an output voltage on signal line 84. As a result, output amplifier 86 produces control signal 60 to drive a particular addressed pixel of micromirror array 52. As control signal 60 increases in magnitude, the reflectivity of the selected, addressed pixel decreases.

Figure 4:
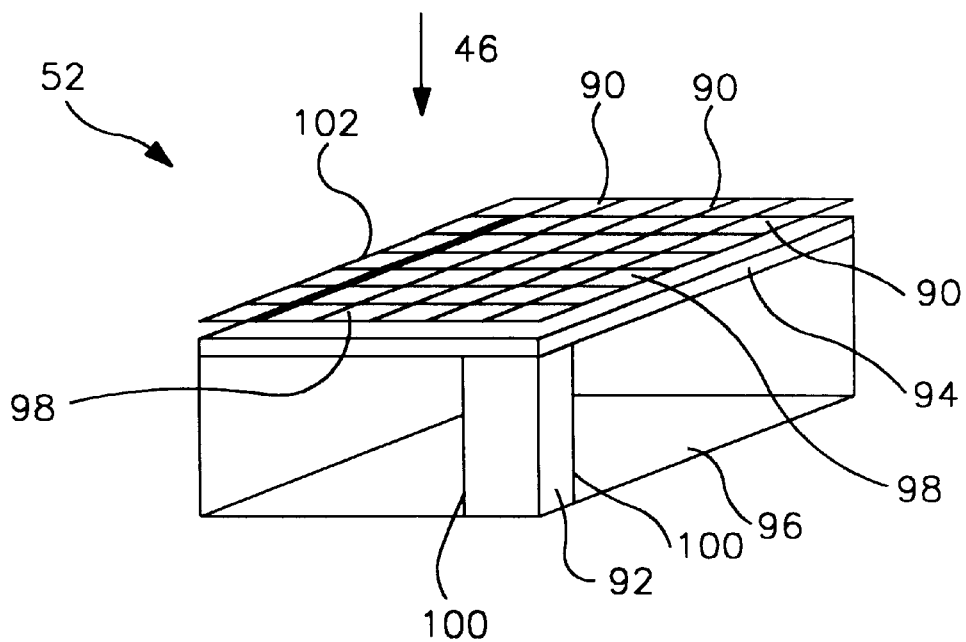
FIG. 4 is a perspective view of a liquid crystal display adaptive focal plane.

Referring to FIG. 4, a perspective view of the adaptive focal plane or micromirror array 52 is shown. As embodied herein, micromirror array 52 is a cholesteric liquid crystal display (LCD) having a plurality of transparent cells 90, also referred to as pixels or micromirrors. As described above, each pixel 90 of the adaptive focal plane 52 corresponds to a particular pixel of detector array 56. Adaptive focal plane 52 is programmed to change the reflectivity of a particular pixel 90 when the portion of radiation beam 62 irradiates the co-registered pixel of detector array 56 above a predetermine value. The irradiated pixel of detector array 56 emits an output signal 58 to comparator 70 of FIG. 3, thus producing a control signal 60 which causes the reflectivity of the co-registered pixel 90 to correspondingly decrease. This prevents the pixel of detector array 56 from overloading. In the context of tracking system 10, this eliminates contribution to track jitter arising from the presence of bright burning spots on the missile 16 caused by the laser beam hit spot 20 when the tracker system 10 operates in the same band as the laser weapon 12.

Adaptive focal plane 52 comprises a cholesteric liquid crystal 92 formed in a thin layer between a coverslip or coverplate 94 and a ground electrode 96 formed on the backface of adaptive focal plane 52. Coverslip 94 includes a plurality of transparent, indium oxide electrodes 98 formed on the front face of the adaptive focal plane 52. The electrodes 98 correspond to the cells or pixels 90 of the adaptive focal plane 52. Each pixel 90 is further defined by thin spacers 100 which confine the liquid crystal material for each pixel 90.

As is well known in the art, but will be described herein, cholesteric liquid crystals are long chain fatty molecules that form layers so that when the layers are stacked, light passing through them in a direction normal to the stacked layer accumulates a twist in its polarization. Each layer has the long axes of the molecules aligned at small angles to the previous layer to form a repetition of the stacking pattern every p layers. As is further known, wavelength regions of small optical activity from polarized light center about a wavelength $\lambda_o$ defined by the average of the ordinary and extraordinary refractive indices times the pitch or number of layers p, as shown in equation 1 below.

$$\lambda_0 = \frac{(n_e + n_0)}{2} \overline{p} = \overline{n}\overline{p} \qquad (1)$$

Where
$\lambda_o$=the center wavelength;
$n_o$=ordinary refractive index;
$n_e$=extraordinary refractive index;
$\overline{p}$=average number of layers per repeating stack; and
$\overline{n}$=average refractive index.

Further, the width of the optically active waveband depends on the difference between the ordinary and the extraordinary refractive indeces times the center wavelength $\lambda_o$, as shown below:

$$\Delta\lambda_{FWHM} = \frac{2(n_e - n_0)}{(n_e + n_0)}\lambda_0 \qquad (2)$$

where $\Delta\lambda_{FWHM}$=the difference in wavelength for full width at half maximum; and $\lambda_o$, $n_o$, and $n_e$ are as defined above.

Circularly polarized light incident upon a cholesteric liquid crystal will be reflected if its handedness matches the sense of helical rotation of the molecule directors. The incident light experiences a discontinuous change and refractive index as it progresses from layer to layer causing constructive optical interference. The reflected light travel in accordance with the equation:

$$\lambda = \lambda_0\left[\cos\left(\frac{\sin^{-1}(\overline{n}^{-1}\sin\phi_i)}{2} + \frac{\sin^{-1}(\overline{n}^{-1}\sin\phi_r)}{2}\right)\right] \qquad (3)$$

where
$\phi_i$=the incidence angle;
$\phi_r$=the reflectance angle; and
$\lambda_o$, and $\overline{n}$ are as defined above.

This angular reflectance is analogous to reflectance from multi-layer dielectric stacks except higher orders do not appear unless the internal structure of the liquid crystal molecules are altered in a prescribed fashion. In this particular invention, the incidence angle is normal. Thus, the cholesteric liquid crystals will completely reflect either their right handed or left handed circularly polarized light with the appropriate pitch sense provided that there are least approximately 10 layers. Because circularly polarized light from an unpolarized source typically has two oppositely rotating components, the cell material of interest in this invention will be a mixture of left and right rotating materials, such as cholesteric halides and nonanoates. Further, an electrical field applied perpendicular to the molecular plane will cause the molecules to line up with the field, thus disrupting the mirror arrangement described above.

Referring to FIG. 4, radiation 46 enters adaptive focal plane 52 from the top 102. Because the material for electrodes 98 and coverslip 94 are transparent in the operating wavelength band, light passes through electrodes 98 and coverslip 94. When no electrical signal is applied to electrodes 98, the molecules of cholesteric crystal 92 align randomly, thereby reflecting substantially all the radiation striking individual cells or pixels 90. Upon application of an electrical signal to electrodes 98, the molecules of cholesteric liquid crystal 92 align, thereby enabling radiation 46 to pass through the cholesteric liquid crystal to common electrode 96. The black surface of common electrode 96 reduces reflectivity of that particular cell or pixel 90.

In particular applications, the contrast ratio of adaptive focal plane 52 can be enhanced if cover plate 94 includes a narrow band filter with the center wavelength tuned to maximum reflecting wavelength. The bandwidth of the narrow band filter is preferably 20 percent above or 20 below the center operating wavelength. Although adaptive focal plane 52 is described herein as an LCD, one skilled in the art that any reflective array having addressable, pixels of variable reflectivity may be substituted for the LCD described herein.

Referring back to FIG. 2, each micromirror 90 of micromirror array 52 is initially maintained in its maximum reflectivity configuration. If, however, the signal level corresponding to image intensity from a particular pixel in detector array 56 exceeds a predetermined threshold, a signal is generated that reduces the reflectivity of the corresponding micromirror 90 by causing it to pass light to electrode 96 where it is absorbed, thereby maintaining the signal from the corresponding pixel in detector array 56 at or below a predetermined value. The signal causing micromirror 90 to have a prescribed waveform such that the fraction of time that micromirror 90 is in its normal, maximum reflecting state is controllable. Therefore the reflectivity of the individual micromirror elements 90 can be controlled to provide at least a gray scale with 256 steps if that is needed. A gray scale will be entirely adequate for the purposes of this invention because subsequent image processing applied to the output of detector array 56 will be on a binary image consisting of 1's and 0's.

All target elements will therefore be 1's if the signal threshold exceeds the clipping level needed to establish a binary image whereas all background pixels will be set to 0. In this manner, the system determines the target shape.

As a result, detector array 56 detects the missile image, which is formed from a low level radiation such as long wave infrared radiation, which is lower than the radiation forming the laser beam hit spot 20, which is typically medium wave infrared radiation. Thus, laser beam hit spot 20 is limited in irradiance by action of micromirror array 52. The tracker polarization of the target radiation described above ensures that only radiation from the target is passed to detector array 56.

Figure 5:
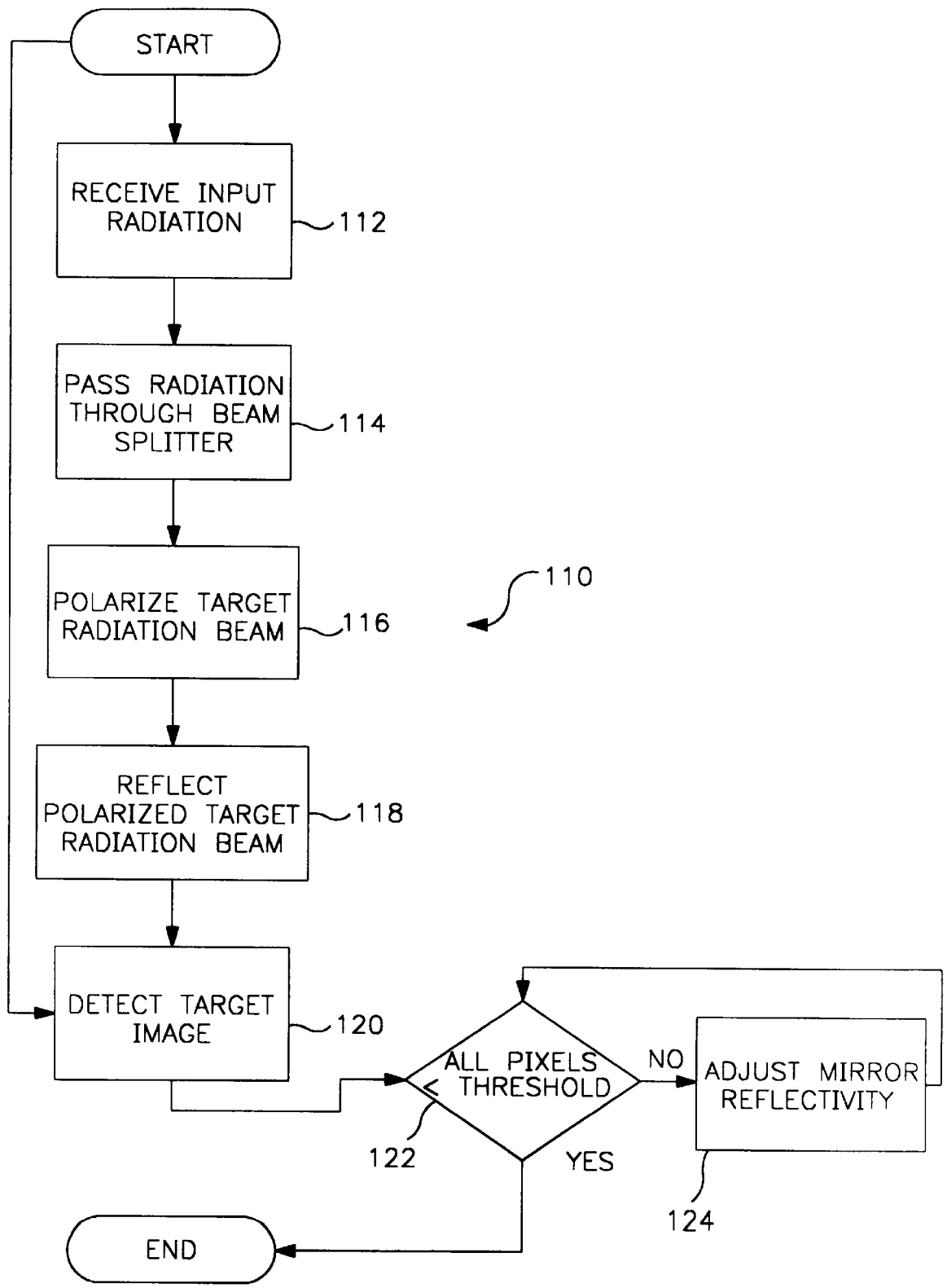
FIG. 5 illustrates a flow diagram methodology for controlling the micromirrors of the adaptive focal plane.

Referring to FIG. 5, a flow diagram illustrating the methodology associated with operation of adaptive focal plane 52 the present invention is shown generally at 110. At 112, the system receives input radiation. At 114, the beam splitter splits the radiation. At 116, the system polarizes the target radiation beam. At 118, the adaptive focal plane or micromirror array reflects the polarized target radiation beam to create a beam of radiation that is circularly polarized, but having an orientation that is perpendicular to the radiation beam polarized at step 116. At step 120, the system detects a target image from the radiation beam reflected at step 118. At step 122, tracker electronics determine if radiation detected by any of the coregistered pixel in the adaptive focal plane 52 are below a predetermined threshold irradiance. At step 122, if all pixels are not below the threshold, the system adjusts the mirror reflectivity until all pixels are below the threshold as shown at step 124. If all pixels are below a threshold value no adjustment to the reflectivity of the adaptive focal plane is made.

As can be appreciated from the foregoing, the adaptive focal plane system of the present invention enables the capture of high contrast images having objects of relatively high and low irradiance with minor distortion or loss of image within the irradiance band of interest. The pixels of the adaptive focal plane are coregistered with the pixels of the detector array so that the reflectivity of the adaptive focal plane can be adjusted on a pixel by pixel basis to reduce reflectivity of only selected pixels. By providing an adaptive focal plane with controllable, addressable pixels, lower intensity portions of high contrast images may be captured with a minimum loss of data. Further, one skilled in imaging technology will readily recognize that the adaptive focal plane of the present invention may easily be applicable to applications beyond the weaponry application described herein. Such applications include character recognition for selective erasure for portions of the image with continues erasure as the image changes. Such various fields also include X-ray, MRI, and CATSCAN. One skilled in the art will further recognize that different approaches to controlling the adaptive focal plane might preserve and enhance various portions of an image. Thus, the system of the present invention has wide range in application for all fields of high contrast imaging.

Various other advantages of the present invention will become apparent to those skilled in the art after having the benefit of studying the foregoing text and drawings, taken in conjunction with the followings claims.

I claim:

1. A high contrast imaging optical system, comprising:
   receiver optics that receive radiation from a detected target, the radiation having sections of varying intensity;
   a polarizing beam splitter that reflects a first portion of the radiation and passes through a second portion of the radiation, the polarizing beam splitter linearly polarizing the second portion of the radiation;
   a beam polarizer that circularly polarizes the linearly polarized second beam of the radiation; and
   a mirror that reflects the circularly polarized radiation back through the beam polarizer to linearly polarize the reflected, second beam of radiation, the linearly polarized reflected beam being reflected by the beam splitter in a direction for imaging, the mirror having a plurality of sections whose reflectivity may be varied, where the reflectivity of a section is varied to reduce the reflectivity when the section is irradiated by circularly polarized radiation that exceeds a predetermined threshold.

2. The system of claim 1, further comprising an image detector array in optical alignment with the polarizing beam splitter that detects a target image from the reflected, linearly polarized radiation.

3. The system of claim 2, wherein the sections of the mirror comprise micromirrors, each micromirror having a reflectivity that is variable in accordance with application of a control signal, where the control signal for each micromirror varies in accordance with the intensity of the radiation irradiating the micromirror.

4. The system of claim 3, wherein each micromirror is addressable so that a particular waveform varies the reflectivity of the addressed micromirror, thereby substantially reducing reflectivity of the addressed micromirror when a section of the circularly polarized radiation is above a predetermined threshold and limiting the irradiance detected by a corresponding section of the image detector array.

5. The system of claim 2, wherein the image detector array comprises a detector array in optical communication with the polarizing beam splitter, the detector array receiving the reflected radiation and generating electrical signals in response thereto.

6. The system of claim 5, wherein the detector array comprises a charge coupled device (CCD) array.

7. The system of claim 5, wherein the detector array comprises a focal plane detector array.

8. The system of claim 2, wherein the detector array comprises a liquid crystal display (LCD) array.

9. The system of claim 2, wherein the array of micromirrors comprises a flexure beam micromirror array.

10. The system of claim 1, wherein the beam polarizer comprises a quarter wave plate.

11. The system of claim 1, wherein the receiver optics comprise a first receiver lens having a first focal length and a recollimating lens that receives the detected radiation passed through the receiver lens and that recollimates the detected radiation before passing the detected radiation to the beam splitter.

12. The system of claim 11, wherein the mirror and the optics are in conjugate focal planes.

13. The system of claim 11, further comprising a detector imaging lens located between the polarizing beam splitter and the detector array for imaging the reflected beam of radiation onto the detector.

14. The system of claim 1, wherein the mirror reflects the circularly polarized radiation back through the beam polarizer to linearly polarize the second beam of detected target radiation and to orient the reflected radiation perpendicularly, with respect to the second beam before it is reflected by the mirror, in a second direction for imaging purposes.

15. The system of claim 2, wherein each element of the detector array defines a pixel, and further comprising an image processor for determining the intensity of radiation irradiating each pixel, the image processor generating a control signal for varying the reflectivity of a particular section of the mirror corresponding to the each pixel, thereby maintaining the radiation irradiating the each pixel below a predetermined threshold.

16. The system of claim 15 wherein each pixel of the image detector array is coregistered with a corresponding section of the mirror.

17. A method of high contrast imaging, comprising the steps of:

receiving incident radiation from a target, the incident radiation having sections of relative high and low intensity;

separating the incident radiation into a first beam of radiation and a second beam of radiation from the target;

circularly polarizing the second beam of radiation from the target;

reflecting the circularly polarized second beam of radiation from an adaptive focal plane;

determining the intensity of the second beam striking the adaptive focal plane;

varying the reflectivity of the adaptive focal plane in accordance with the intensity of the second beam to maintain the irradiance below a predetermined threshold.

18. The method of claim 17, wherein:

the step of determining the intensity of the second beam further comprises the step of determining in a segmented manner whether the circularly polarized second beam of targeted object radiation exceeds a predetermined intensity threshold; and the step of varying the reflectivity of the adaptive focal plane further comprises the step of varying the reflectivity of the adaptive focal plane if the second beam of targeted object radiation exceeds the predetermined intensity threshold to cause the polarized second beam of radiation to fall below the predetermined intensity threshold.

* * * * *